United States Patent [19]

Gailey

[11] Patent Number: 4,546,988
[45] Date of Patent: Oct. 15, 1985

[54] CHUCK TOP JAW WITH REMOVABLE INSERT

[75] Inventor: Edward D. Gailey, Mentor, Ohio

[73] Assignee: The S-P Manufacturing Corporation, Cleveland, Ohio

[21] Appl. No.: 520,552

[22] Filed: Aug. 5, 1983

[51] Int. Cl.⁴ .............................................. B23B 31/16
[52] U.S. Cl. ................................. 279/123; 279/1 SJ
[58] Field of Search ................... 279/123, 1 SJ, 1 L, 279/1 R, 110; 269/273

[56] References Cited

U.S. PATENT DOCUMENTS

| | | | |
|---|---|---|---|
| 917,387 | 4/1909 | Webb et al. | 279/123 |
| 1,799,019 | 3/1931 | Mischler | 279/123 |
| 2,045,487 | 6/1936 | Oslind | 279/123 |
| 2,778,652 | 1/1957 | Ingwer et al. | 279/123 |
| 3,151,862 | 10/1964 | Nicosia | 269/273 |
| 3,179,430 | 4/1965 | Zierden | 279/123 |
| 3,583,717 | 6/1971 | Hall | 279/123 |
| 3,679,221 | 7/1972 | Behrens | 279/1 SJ |
| 3,868,120 | 2/1975 | Blattry | 279/123 |
| 4,277,073 | 7/1981 | Ferguson | 279/1 SJ |

FOREIGN PATENT DOCUMENTS

| | | | |
|---|---|---|---|
| 2509698 | 9/1976 | Fed. Rep. of Germany | 279/123 |
| 150669 | 6/1921 | United Kingdom | 279/123 |
| 576966 | 4/1946 | United Kingdom | 279/123 |
| 1050472 | 12/1966 | United Kingdom | 279/123 |

*Primary Examiner*—William R. Briggs
*Attorney, Agent, or Firm*—Watts, Hoffmann, Fisher & Heinke

[57] ABSTRACT

A top jaw for attachment to a rotary chuck, with inserts removably secured to a base, constructed to facilitate changing inserts with automated equipment. Slidably engageable pins and slots on the base and insert require positioning and removal of the insert with two directions of relative movement and thereby inhibit separation of the insert from the base from forces applied other than is a prescribed direction and sequence. The insert is releasably held to the base by detents.

11 Claims, 13 Drawing Figures

CHUCK TOP JAW WITH REMOVABLE INSERT

DESCRIPTION

1. Technical Field

This invention relates to a top jaw construction for a rotary chuck in which an improved base and insert facilitate automatic insert changing.

2. Background Art

Rotary chucks of a typical construction have radially movable master jaws in a front face that carry removable work-gripping jaws. One form of work gripping jaw utilizes a base and an insert. The insert is attached to the base and directly grips the workpiece. Inserts of different sizes or having different work gripping faces are usable with a single base and accommodate gripping different sized workpieces or differently contoured workpiece surfaces.

The base and insert are constructed so the gripping force against a workpiece retains the insert in engagement with locating surfaces on the base and properly positioned to accurately locate the workpiece in the chuck. Threaded fasteners or interengaging ball and detent arrangements have been used or suggested to retain the insert to the base when a workpiece is not being gripped.

DISCLOSURE OF THE INVENTION

The present invention is a top jaw for a chuck in which an insert that directly engages a workpiece is constructed to be removably received and accurately positioned against locating surfaces on a base, through movement in two directions; specifically, axially of the chuck toward the base and then radially; and without the need for threaded fasteners or separate attachment operations to retain the insert, other than the movements that place the insert on the base.

Both the base and the insert have first locating surfaces that extend radially of a supporting chuck, second locating surfaces that extend transversely of the first, and third locating surfaces that are perpendicular to the other two, so when the locating surfaces of the base and insert are in mutual contact the insert is accurately positioned. Positioning is accomplished by moving the insert axially of the chuck against the base, bringing the radial first locating surfaces into mutual contact. At the same time, the third locating surfaces of the insert straddle the base in opposed contact with the third locating surfaces of the base. The insert is then moved radially outwardly of the chuck axis to bring the second locating surfaces into mutual contact. The insert is retained in this position by suitable interengagement preferably spring-biased detents carried by the insert that are received in recesses of the base. This positioning is preferably accomplished with an automatic insert changer or robot that grips the insert, moves it in two successive directions into the located position, releases the insert, and then moves directly away from the base and insert, typically in a single direction axially of the chuck. The insert may be gripped and released by a changer carried by a robot, where the changer engages the insert with spring-biased detents. Alternatively, a robot may utilize actuated grippers to pick up, carry, position, and release an insert Interengaging abutment surfaces and projections are provided on the base and insert to assure that the insert changer does not carry the insert away from the base after it has moved it into the proper located position. This could otherwise occur, e.g., where the detents of the changer might exert a stronger grip on the insert than the insert detents exert on the base, or where actuated grippers fail to release their grip, or where frictional engagement between the gripper and insert results from slight misalignment of the changer and jaw base. These abutment surfaces permit positioning and removing an insert only with a particular two-directional movement. They also inhibit separation of the insert from the base by forces caused by rotation, acceleration, or deceleration of the chuck, especially when no workpiece is gripped.

In a preferred embodiment, a top jaw, for attachment to a master jaw that is slidable radially in a front face of a rotary chuck toward and away from a central rotational axis of the chuck, comprises a base having a radial locating face, a transverse locating face directed centrally of the chuck, and side locating faces perpendicular to the radial locating face; an insert having a radial locating surface, a transverse locating surface for facing outwardly from the chuck axis and cooperating with said base transverse locating face, and side locating surfaces spaced to straddle the base and extending perpendicular to the radial locating surface; one of the base and insert having a radial abutment surface intersecting a side locating face or surface and the other of the base and insert having at least one projection extending from a side locating face or surface said projection being positioned adjacent said abutment surface in a location that prevents movement of the insert relative to the base in a direction axially away from the radial locating face of the base when the transverse locating surface of the insert is adjacent the transverse locating face of the base; and means connecting the insert to the base.

In a preferred construction, the base has one or more slots in side locating surfaces. The slots extend at least partially in a radial direction and the insert has projections that are received in the slots when the insert is moved into proper located position in the base. Detents hold the insert in the located position.

The above features and others will become more apparent from the detailed description that follows.

BEST MODE FOR CARRYING OUT THE INVENTION

Figure 1:
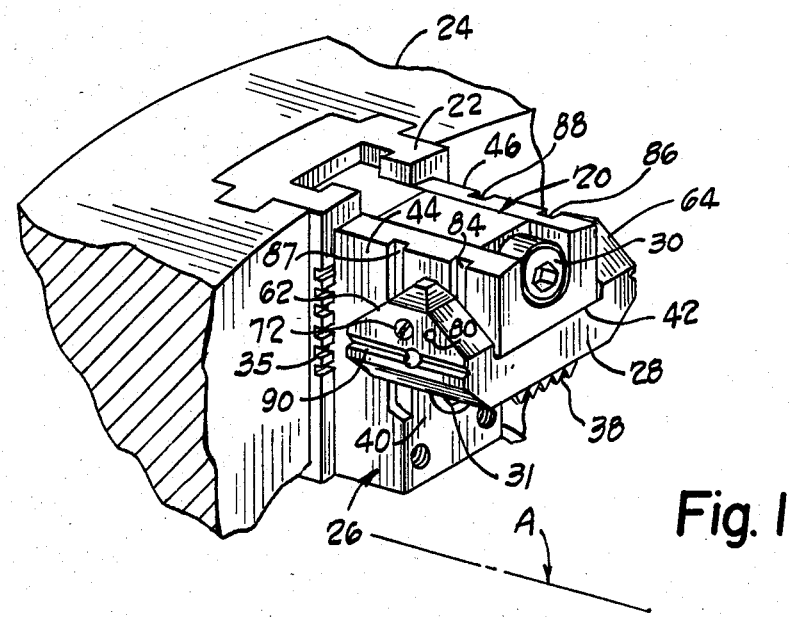
FIG. 1 is a partial perspective view of a chuck showing a top jaw embodying the present invention.

As shown in FIGS. 1-6, a top jaw 20 embodying the present invention is secured to a master jaw 22 of a rotary chuck 24. Although only a portion of the chuck and one master jaw and top jaw are shown, there are typically three such jaws each spaced 120° from the next. The chuck 24 is rotatable about a central axis A and the master and top jaws are movable radially toward and away from the axis A to grip a workpiece, which is to be rotated by the chuck for a machining operation, and then to release the workpiece for replacement.

The top jaw 20 is comprised of a base 26 and a removable insert 28. The base 26 is secured to the master jaw 22 by two socket-headed cap screws 30, 31 and is located with a key 34 adjustable on the master jaw and located with transverse grooves 35, to permit adjusting the radial position of the top jaw for different ranges of workpieces to be gripped. The insert 28 is carried by the base and directly grips a workpiece with an axially facing surface 38, which in the embodiment shown in serrated, but could alternatively be smooth.

The base 26 has four surfaces for locating the insert relative to the base: a surface 40 extending radially of the chuck, a surface 42 (FIG. 5) extending transversely of the chuck and facing axially inward, and two side surfaces 44, 46 that extend perpendicular to the surfaces 40, 42. In the preferred embodiment shown, the transverse locating surface 42 is inclined relative to the axis A of the chuck, at an angle of 80° with the radial surface 40 in the preferred embodiment, to provide a camming action or component of force on the insert when a workpiece is gripped. The component of force tends to urge the insert against the radial locating surface 40.

The insert 28 has four surfaces for coacting with the four locating surfaces of the base, as follows: a surface 50 (FIG. 5) extending radially of the chuck for seating against the surface 40, a surface 52 extending transversely of the chuck and facing radially outward from the axis A for seating against the transverse locating surface 42 of the base, and two side surfaces 54, 56, that straddle the base and face the side locating surfaces 44, 46 of the base.

As best understood from FIGS. 2, 3, 5, 6, and 7, the insert has a solid body portion 60 bounded on two sides by the locating surfaces 50, 52 and on a third side by the work gripping surface 38 facing basically in an opposite direction from the locating surface 52. The side locating surfaces 54, 56 are provided on extending walls 62, 64 (see FIGS. 6 and 7) that extend beyond the solid body portion 60 laterally beyond the locating surfaces 50, 52. A bevel 66, 67 leads from the back edge of each wall 62, 64, to the locating surface 54, 56 so that slight misalignment of the insert relative to the base can be accommodated when the insert is positioned against the radial locating surface 40.

Inwardly facing side surfaces 68, 70 of the walls 62, 64 are spaced apart somewhat farther than the locating surfaces 54, 56 of the same respective walls, to provide a clearance between the surfaces 68, 70 and the opposed side surfaces 44, 46 of the base. This is primarily for fabricating convenience, in that two separate machining operations are required for the surfaces 54 and 68 on the one wall 62, and 56, 70 on the wall 64. By providing a clearance for the portions 68, 70, the difficulty in machining two adjacent surfaces 54, 68 or 56, 70 to the same tolerance is avoided.

Figure 3:
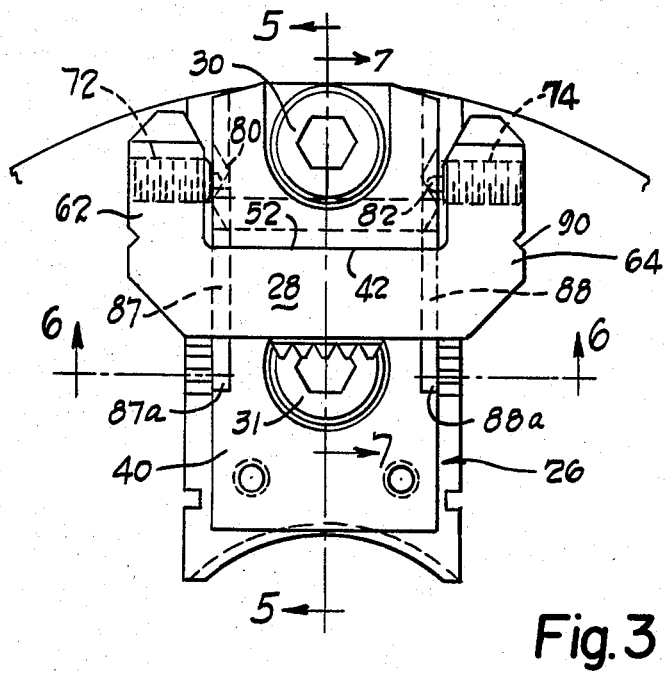
FIG. 3 is a front elevational view of the top jaw of FIG. 2.

The insert 28 is held in engagement with the base 26 by two spring-biased detents, one in each side wall 62, 64, spaced radially outward (in the orientation of use) from the transverse locating surface 52. Springs bias the detents 72, 74 inwardly, i.e., toward each other. The detents cooperate with conical recesses 76, 78 in the two locating sides 44, 46 of the base. The detents, as shown in FIG. 3, are positioned relative to the recesses to act against recess surfaces outward from the center of the conical shapes to bias the insert in a direction toward the surface 42 of the base, to urge the transverse locating surface 52 of the insert against the transverse locating surface 42 of the base and thereby avoid any looseness or play between the insert and base even in the absence of gripping a workpiece (see FIG. 3).

Figure 2:
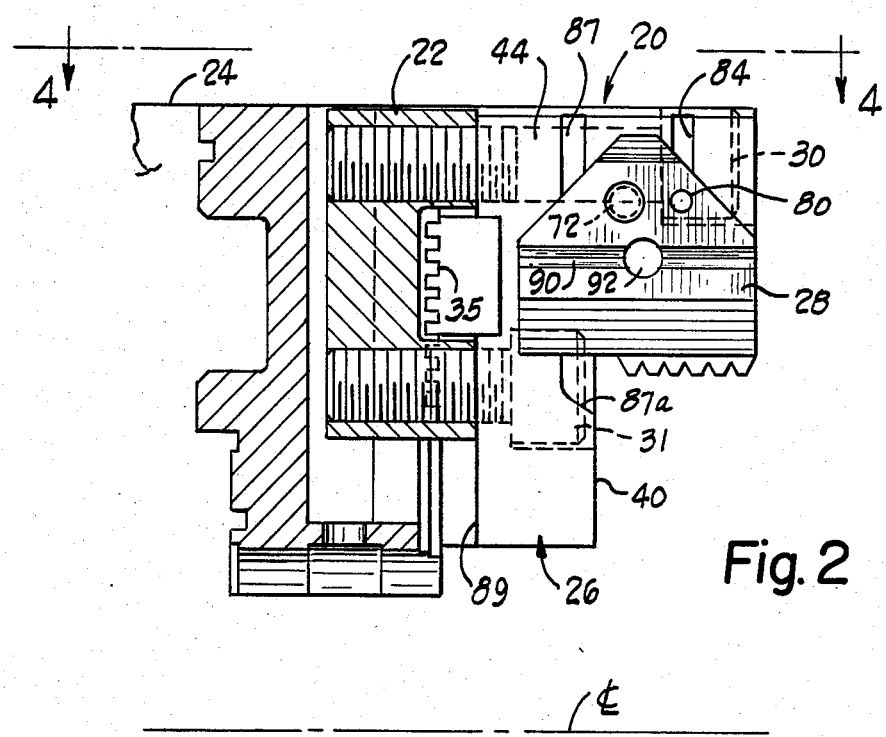
FIG. 2 is a partial side view, with parts in elevation and parts in section, of a chuck with parts removed, corresponding to that of FIG. 1, showing a master jaw and an attached top jaw embodying the present invention.
Figure 4:
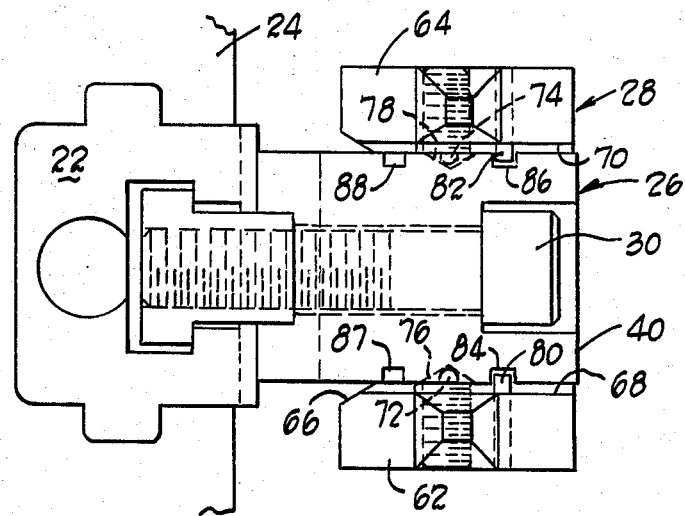
FIG. 4 is a top elevational view of the master jaw and top jaw of FIG. 2 viewed from the line 4—4.
Figure 5:
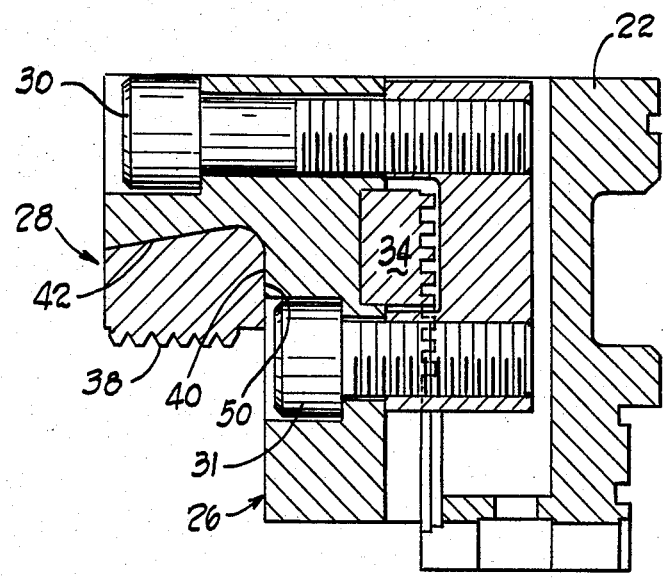
FIG. 5 is a sectional view taken along the line 5—5 of FIG. 3.
Figure 6:
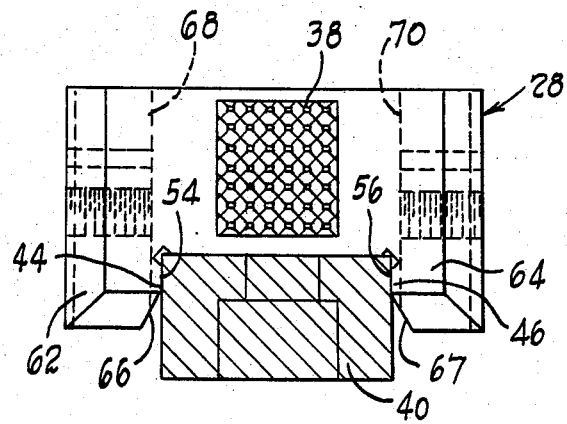
FIG. 6 is a bottom plan view of the insert as viewed from the line 6—6 of FIG. 3.
Figure 7:
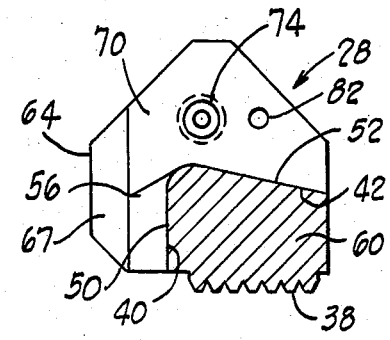
FIG. 7 is a sectional view of the insert of FIG. 3 taken along the line 7—7.

As best shown in FIGS. 2, 4 and 7, a pin 80 is provided in the wall 62, extending inwardly a short distance from the surface 68 and located adjacent the detent 72, radially outward from the locating surface 54. A similar pin 82 is located in the wall 64. The pin 80 cooperates with a radial slot 84 in the side surface 44 of the base, and the pin 82 cooperates with a radial slot 86 in the side surface 46 of the base. Each of the radial slots 84, 86 opens through the transverse locating surface 42 of the base and is spaced the same distance in the axial direction of the chuck from the radial locating surface 40 of the base as the pins are spaced from the radial locating surface 50 of the insert. As a result, when the radial locating surfaces 40, 50 are in mutual contact, the pins 80, 82 are aligned with the radial slots 84, 86. Each radial slot 84, 86 has a slightly wider opening at the surface 42 to accommodate entry of the pins. An additional and longer radial slot 87, 88 in the surfaces 44, 46, respectively, is located closer to a mounting surface 89 of the base and opens at a radially inward end through the locating surface 40 and cooperates with additional pins provided on inserts of longer radial dimensions.

Figure 8:
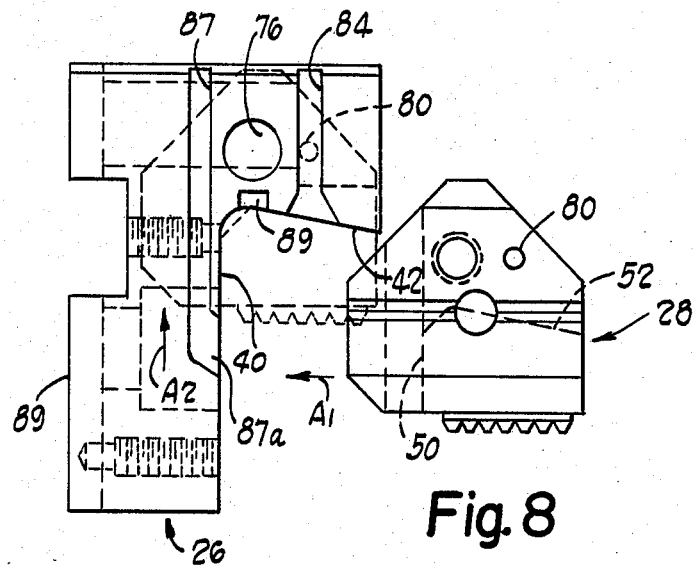
FIG. 8 is a side elevational view of the base as shown in FIG. 2, but with the insert removed and diagrammatically indicating the manner in which the insert is moved into position on the base.
Figure 9:
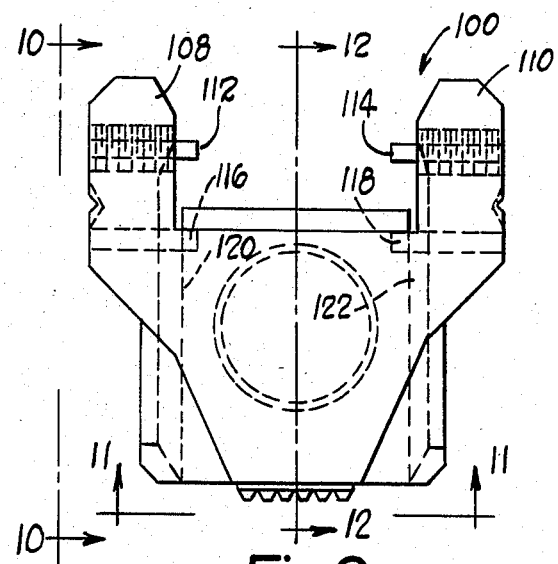
FIG. 9 is a front elevational view of a larger insert embodying the present invention.
Figure 10:
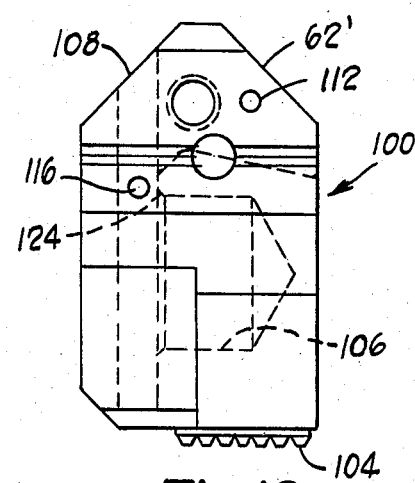
FIG. 10 is a side elevational view of the insert of FIG. 9 as viewed from the line 10—10.
Figure 11:
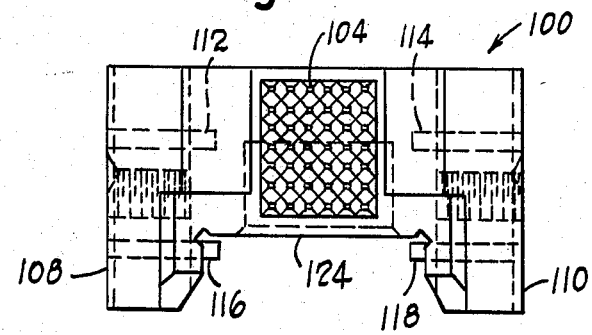
FIG. 11 is a bottom plan view of the insert of FIG. 9 viewed from the line 11—11.

When the insert 28 is placed in position on the base 26, being moved through a position as shown in solid line in FIG. 8 to a position indicated in phantom, utilizing movement in two successive directions, as illustrated by the arrows A1 and A2 in FIG. 8, the pins 80, 82 pass beneath (i.e., radially inwardly of) the transverse locating surface 42 of the base. Once the radial locating surfaces 40, 50 engage, the pins 80, 82 are aligned in the radial direction of the chuck with the radial slots 84, 86. Movement of the insert in the direction of the arrow A2 then places the locating surfaces 42, 52 in mutual contact, and locates the pins within the slots 84, 86. During movement of the insert in the direction of arrow A2, the detents 72, 74 are biased outward by a slight beveled portion 89 on each side of the base and then snap into the conical recesses 76, 78 to retain the insert against the locating surfaces 42, 50 of the base until a workpiece is gripped. Also, until a workpiece is gripped, the pins 80, 82 prevent removal of the insert through movement other than along a reverse of the path by which the insert was placed in position. That is, in the absence of the insert changer retracting first in the direction of arrow A2 and then in the direction of arrow A1, the pins will prevent the insert from following the path taken by the insert changer. As a result, should the changer detents grip the insert too strongly, or should actuated grippers fail to completely release their grip on the insert, or should the changer be slightly out of alignment with the base and thereby maintain frictional contact with the insert, the insert will nevertheless be retained in proper position on the base as the changer retracts. Typically, the changer retracts in a single direction, such as that opposite to the arrow A1. In addition, as can be seen from the phantom position of the insert in FIG. 8, any forces that might otherwise tend to rock the insert relative to the base about an axis off-set from the pins 80, 82, would be resisted by those pins. Thus, in the event the chuck is rotated without a workpiece, the pins provide additional assurance apart from the retention afforded by centrifugal force and the detents, that the insert will remain attached to the base.

An external groove 90 across each side wall 62, 64, and a central depression 92 serves to support the insert in a rack for storage, facilitating automatic removal through the insert changer, which accommodates use of different sized inserts for different workpieces.

A second embodiment of an insert 100 is shown in FIGS. 9-12. The insert 100 is longer in the radial direction of the chuck than the insert 28 and has a substantially longer body portion 102, that positions a work gripping surface 104 closer to the center of a chuck than the surface 38 to grip a smaller diameter workpiece. It will be understood that the radial travel of the master jaw 22 is relatively short, for example, on the order of ¼ inch, and in the absence of different sized inserts, the chuck could not be used with a variety of workpieces varying substantially in diameter. The body portion 102 has a recess 106 for the purposes of weight reduction. In addition, extending walls 108, 110, longer but corresponding to walls 62, 64 of the insert 28, have, in addition to two pins 112, 114 that correspond with the pins 80, 82 of the insert 28, second pins 116, 118. The second pins 116, 118 are located radially inwardly of the pins 112, 114 and axially closer to the chuck, extending from side locating surfaces 120, 122 that correspond to the surfaces 54, 56 of the insert 28 and are adjacent a radial locating surface 124 that corresponds to the surface 50 of the insert 28.

The second pins 116, 118 are receivable in the radial slots 87, 88 through openings 87a, 88a in the radial locating face 40 of the base. The openings 87a, 88a are positioned along the radial length of the surface 40 a distance from the transverse locating surface 42, so that the second pins 116, 118 are aligned in the axial direction of the chuck with the openings 87a, 88a when the first pins 80, 82 are radially inward of the transverse locating surface 42, specifically when the insert is in a relative location as shown in solid line in FIG. 13. As a result, when the insert is moved in the direction of the arrow A3 of FIG. 13 until the locating surface 124 contacts the radial locating surface 40 of the insert, the pins 112, 114 are aligned with the openings to the radial slots 84, 86 and the pins 116, 118 are received in the openings 87a, 88a and are aligned with the radial portions of the slots 87, 88. Upon movement of the insert in the direction of the arrow A4 of FIG. 13, the two sets of pins 112, 114 and 116, 118 move in a radial direction within the respective slots to the phantom position shown in FIG. 13. When in the phantom position, the insert covers the openings 87a, 88a both at the side surfaces 44, 46 of the base as well as at the radial locating surface 40, so that clips or the like from a machining operation cannot enter the slots to block removal of the insert by obstructing the pins from being moved radially toward the center of the chuck and out of the slot. Because the smaller insert of FIGS. 1-8 does not cover the openings 87a, 88a, no second pin is provided with the smaller inserts, which could be blocked by such chips or the like.

Figure 13:
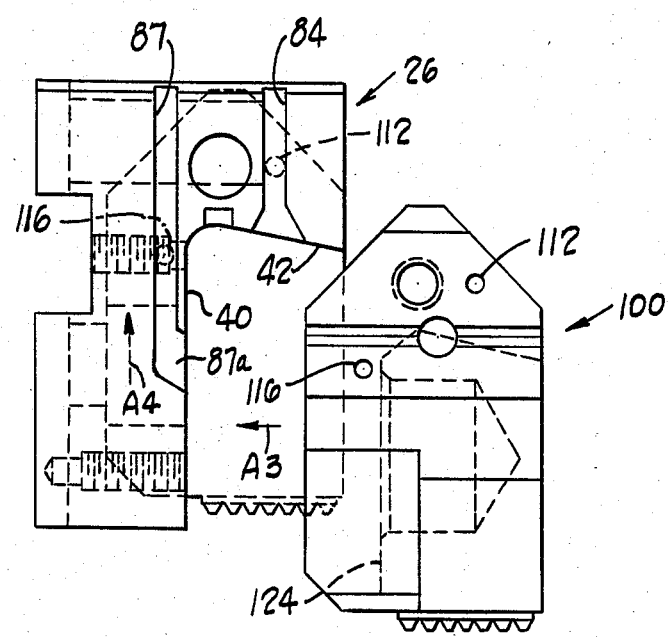
FIG. 13 is a diagrammatic side elevational view of a base and the insert of FIGS. 9-12, illustrating the manner which the insert is moved into position on the base.
Figure 12:
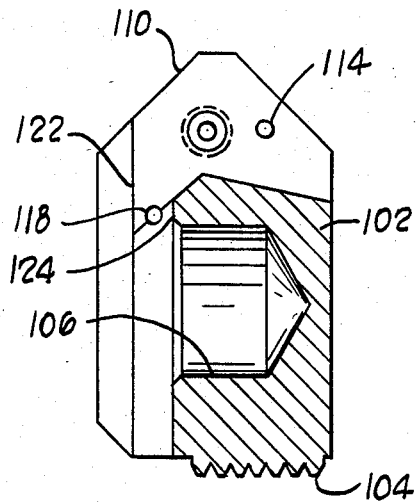
FIG. 12 is a sectional view taken along the line 12—12 of FIG. 9.

As will be apparent from FIG. 13, the second pins 116, 118 further aid the pins 112, 114 in retaining the insert 100 positioned against the base 26, in the event forces tend to dislodge the insert in a direction other than directly radially inward toward the axis of the chuck. In particular, the second pins 116, 118 further stabilize against forces that may be exerted because of the enlarged size of the insert 100 as compared with the insert 28, and because of the different location of its center of gravity.

While preferred embodiments of the invention have been described in detail, various modifications or alterations may be made therein without departing from the spirit and scope of the invention as set forth in the appended claims.

I claim:

1. A top jaw for attachment to a master jaw slidable radially in a front face of a rotary chuck toward and away from a central rotational axis of the chuck comprising:

a base having a radial locating face, a second locating face directed centrally of a chuck, and a first side with a third locating face perpendicular to the radial locating face, an insert having a radial locating surface, a second locating surface for facing away from the chuck axis and cooperating with said base second locating face, and a second side having a third locating surface extending perpendicular to the radial locating surface, said base having a radially extending abutment surface along said first side facing axially of the chuck in an opposite direction from the radial locating face and the insert having at least one projection from said second side cooperable with the abutment surface, said projection being positioned adjacent said abutment surface in a location that prevents movement of the insert relative to the base in a direction axially away from the radial locating face of the base when the said second locating surface of the insert is adjacent the said second locating face of the base, and means connecting the insert to the base.

2. A top jaw as set forth in claim 1 wherein said abutment surface is part of a first slot in said first side of the base.

3. A top jaw for attachment to a master jaw slidable radially in a front face of a rotary chuck toward and away from a central rotational axis of the chuck, comprising:

a base having a radial locating face, a transverse locating face directed centrally of a chuck, and first and second sides each with a locating face perpendicular to the radial locating face, an insert having a radial locating surface, a transverse locating surface for facing away from the chuck axis and cooperating with said base transverse locating face, and third and fourth sides opposed to said first and second sides and each with a side locating surface spaced to straddle the base and extending perpendicular to the radial locating surface, one of the base and insert having a radially extending abutment surface along a said side thereof facing axially of the chuck in an opposite direction from the radial locating face and the other of the base and insert having at least one projection extending from an opposed said side and cooperable with said abutment, said projection being positioned adjacent said abutment surface in a location that prevents movement of the insert relative to the base in a direction axially away from the radial locating face of the base when the transverse locating surface of the insert is adjacent the transverse locating face of the base, and means connecting the insert to the base.

4. A top jaw as set forth in claim 3 wherein said radial abutment surface is part of a first slot.

5. A top jaw for attachment to a master jaw slidable radially in a front face of a rotary chuck toward and away from a central rotational axis of the chuck, comprising:

a base having a radial locating face, a transverse locating face directed centrally of a chuck, and first and second sides each with a locating face perpendicular to the radial locating face, an insert having a radial locating surface, a transverse locating surface for facing away from the chuck axis and cooperating with said base transverse locating face, and third and fourth sides opposed to said first and second sides and each with a side locating surface spaced to straddle the base and extending perpendicular to the radial locating surface, one of the base and insert having first and second slots at least in part parallel and forming radial abutment surfaces intersecting a said side, and the other of the base and insert having first and second projections extending from an opposite one of said sides to be received concurrently in said slots, said projections being positioned adjacent said abutment surfaces in locations that prevent movement of the insert relative to the base in a direction axially away from the radial locating face of the base when the transverse locating surface of the insert is adjacent the transverse locating face of the base, and means connecting the insert to the base.

6. A top jaw for attachment to a master jaw slidable radially in a front face of a rotary chuck toward and away from a central rotational axis of the chuck, comprising:

a base having a radial locating face, a transverse locating face directed centrally of a chuck, and first and second sides each with a locating face perpendicular to the radial locating face, an insert having a radial locating surface, a transverse locating surface for facing away from the chuck axis and cooperating with said base transverse locating face, and third and fourth sides opposed to said first and second sides and each with a side locating surface spaced to straddle the base and extending perpendicular to the radial locating surface, one of the base and insert having a slot defining a radial abutment surface intersecting a said side and opening through said transverse locating face and the other of the base and insert having at least one projection extending from an opposed said side, said projection being positioned adjacent said abutment surface in a location that prevents movement of the insert relative to the base in a direction axially away from the radial locating face of the base when the transverse locating surface of the insert is adjacent the transverse locating face of the base, and means connecting the insert to the base.

7. A top jaw as set forth in claim 5 wherein said second slot opens through said radial locating face.

8. A top jaw as set forth in claim 3 wherein said means yieldably urges the insert into contact with the transverse locating face of the base.

9. A top jaw for attachment to a master jaw slidable radially in a front face of a rotary chuck toward and away from a central rotational axis of the chuck, comprising:

a base having a radial locating face, a transverse locating face directed centrally of a chuck, and first and second sides each with a locating face perpendicular to the radial locating face, an insert having a radial locating surface, a transverse locating surface for facing away from the chuck axis and cooperating with said base transverse locating face, and third and fourth sides opposed to said first and second sides and each with a side locating surface spaced to straddle the base and extending perpendicular to the radial locating surface, each said transverse locating face and surface forming an included angle of fewer than 90° with the respective radial locating face and surface, one of the base and insert having a radial abutment surface intersecting a said side and the other of the base and insert having at least one projection extending from an opposed said side, said projection being positioned adjacent said abutment surface in a location that prevents movement of the insert relative to the base in a direction axially away from the radial locating face of the base when the transverse locating surface of the insert is adjacent the transverse locating face of the base, and means connecting the insert to the base.

10. In a rotary chuck, a jaw movable radially of a rotary chuck toward and away from a central rotational axis of the chuck, and an insert therefor; said jaw having a radial locating face, a second locating face directed centrally of the chuck, and a first side having a third locating face transverse to the radial locating face; said insert having a radial locating surface, a second locating surface facing away from the chuck axis and cooperating with said jaw second locating face, and a second side having a third locating surface extending transversely to the radial locating surface; the jaw having a radially extending abutment along said first side facing axially of the chuck in an opposite direction from the radial locating face and the insert having at least one projection extending from said second side cooperable with the abutment to prevent movement of the insert relative to the jaw in a direction axially away from the radial locating face of the jaw when the said second locating surface of the insert is adjacent the said second locating face of the jaw.

11. A jaw movable radially of a rotary chuck toward and away from a central rotational axis of the chuck comprising a radial locating face, a second locating face directed centrally of a chuck, and a first side with a third locating face perpendicular to the radial locating face,
- an insert for the jaw having a radial locating surface, a second locating surface for facing away from the chuck axis and cooperating with said jaw second locating face, and a second side having a third locating surface extending perpendicular to the radial locating surface,
- one of the jaw and insert having a groove at least a part of which extends radially along one of said first and second sides and with an entrance opening in a surface of the jaw or insert that intersects said one of said sides, and the other of said jaw and insert having at least one projection from the other of said first or second sides cooperable with the groove,
- said projection being positioned within said groove at a location that prevents movement of the insert relative to the jaw in a direction axially away from the radial locating face of the jaw when the said second locating surface of the insert is adjacent the said second locating face of the jaw, and
- means connecting the insert to the jaw.

* * * * *